(12) United States Patent
Kotsch et al.

(10) Patent No.: US 8,359,442 B2
(45) Date of Patent: Jan. 22, 2013

(54) COMPUTER SYSTEM WITH CONTROLLED DATA ACCESS

(75) Inventors: Leszek Kotsch, Vienna (AT); Harald Hoffmann, Vienna (AT)

(73) Assignee: Metadat It-Beratungs- und Entwicklungs- GmbH, Vienna (AT)

( * ) Notice: Subject to any disclaimer, the term of this patent is extended or adjusted under 35 U.S.C. 154(b) by 123 days.

(21) Appl. No.: 12/779,206

(22) Filed: May 13, 2010

(65) Prior Publication Data

US 2010/0293351 A1    Nov. 18, 2010

(30) Foreign Application Priority Data

May 14, 2009    (EP) ..................................... 09160314

(51) Int. Cl.
*G06F 12/14*    (2006.01)
*G06F 12/00*    (2006.01)

(52) U.S. Cl. ................ 711/163; 711/170; 711/E12.094; 711/E12.093

(58) Field of Classification Search .................. 711/163, 711/164, E12.094, E12.093, E12.097
See application file for complete search history.

(56) References Cited

U.S. PATENT DOCUMENTS

| | | | |
|---|---|---|---|
| 6,875,109 B2 | 4/2005 | Stockdale | |
| 6,961,833 B2 | 11/2005 | Leung | |
| 7,114,051 B2 | 9/2006 | Guu et al. | |
| 7,437,568 B2 | 10/2008 | Das-Purkayastha | |
| 2006/0117377 A1 | 6/2006 | Frenkiel et al. | |
| 2007/0143555 A1 | 6/2007 | Nemiroff et al. | |

*Primary Examiner* — Pierre-Michel Bataille
(74) *Attorney, Agent, or Firm* — Andrew Wilford

(57) ABSTRACT

A computer system comprises: a central processing unit (CPU); an input/output control hub (IOCH) connected to the CPU; a storage device; the input/output control hub (IOCH) comprising a direct data access control (DDAC) being connected to the storage device; the DDAC providing protected regions and unprotected regions on the storage device (HDD). The IOCH comprises in addition to the DDAC an interface for semantic control of data access (SCDA), the SCDA storing custom configuration data which can be loaded only by a dedicated service which controls protected code running on the CPU. Via the SCDA, files in protected regions can be accessed on a record or even field level, whereby each record or field can have different access rights.

11 Claims, 4 Drawing Sheets

COMPUTER SYSTEM WITH CONTROLLED DATA ACCESS

TECHNICAL FIELD

The present invention relates to a computer system. More particularly, the present invention relates to computer system interaction with logically partitioned hard storage devices.

BACKGROUND ART

There is a method to block read/write access to sectors of a Hard Disk Drive HDD known as Host Protected Area HPA. It is defined by Technical Committee T13 industry standards group, which is part of the International Committee on Information Technology Standards INCITS responsible for interface standards relating to the AT Attachment ATA storage interface. The disadvantage of HPA is that the mechanism allows only for a single set of sectors or a single region of a HDD to be protected. In addition, HPA is cumbersome in that it is difficult to dynamically lock and unlock read/write access to the protected region.

WO 2007/078648 A improves HPA by allowing for multiple sets of sectors or multiple regions of a HDD to be protected, and by simplifying dynamic locking and unlocking read/write access to protected regions. The disadvantage of this solution is that the mechanism allows for protected reference to the data only based on the location of the data on an exceptionally partitioned HDD, regardless of the type and value of these data. Therefore, it is not possible to allow access to only parts of a file, e.g. to records or even fields in records of a database; either the whole file is accessible or not. In addition, this solution is cumbersome in that it does not specify how to authenticate the user authorised to use the protected regions.

EP 1669833 A specifies a mechanism to validate a trusted computer system by identifying components detected within said system, and to protect the transaction or the service delivered by that system. The disadvantage of this solution is that this mechanism allows only for the authentication of a user wishing to perform a transaction or to use a service, regardless the type, the value, and the location of the data to be processed by this transaction or that service.

DISCLOSURE OF INVENTION

It is an object of the present invention to improve the system according to WO 2007/078648 A making it possible to protect only parts of a file, e.g. records or even specific fields of a database.

According to the invention the input/output control hub IOCH comprises in addition to the direct data access control DDAC an interface for the semantic control of data access SCDA. Therefore files which are located in protected regions of the data storage device can be accessed via SCDA, SCDA being able to grant permission on a record or even field basis. It is important that the whole file is located in a protected region in order to make it invisible to the native I/O-system. Otherwise a hacker could copy the whole file to another location making SCDA obsolete.

Preferably an auxiliary input/output control AIOC subsystem is provided between IOCH and the storage device HDD which manages, maintains, and controls the access to the storage device HDD, which AIOC is connected to IOCH by separate channels to provide access to data in unprotected areas of HDD using DDAC and to data in protected areas of HDD using SCDA. In this case the AIOC can divide the data storage device HDD into logical volumes which are recognized based upon MetaData.

According to another embodiment the IOCH includes a trust control module TC storing and executing data and instructions which can be loaded into the trust control module TC only by a dedicated service which controls protected code running on CPU. Using a trust control module TC is a reliable method to ensure that only protected code is executed.

Preferably the trust control module TC includes authentication firmware and authorization firmware as well. Authentication firmware is used to identify the user, whereas the authorization firmware checks whether or not the user is allowed to gain access according to her or his particular request.

According to a preferred embodiment of the present invention SCDA includes Request Processing Firmware RPF augmented by stores for static custom data sets, i.e. a Current Index Store CIS and a Volume Formatting Store VFS, VFS keeping actual descriptions of rules used by RPF for data tracking and keeping terms used by RPF to evaluate compliance between the data stored on volumes visible to SR services and an I/O Request, or an Administration Request, both being issued by an eligible user of computer system. The Current Index Store CIS keeps data patterns obtained by Request Processing Firmware RPF by tracking all data moved into volumes visible to SR services according to rules kept in the Volume Formatting Store VFS. The Current Index Store CIS keeps for all these gained data patterns pointers to all such data stored on volumes visible to SR services which can be unequivocally identified by gained patterns. Data kept by CIS and VFS are custom data which alter in the course of user activities over life cycle of computer system. RPF manages required changes of data kept in the stores CIS and VFS by performing all necessary administrative transactions with atomicity, consistency, integrity, and durability (ACID) properties. In case of an I/O request RPF determines based on static custom data kept by the VFS whether the types of content-specific data conveyed by the request meet the compulsory terms and whether the methods required to process content-specific data conveyed by the request meet the compulsory terms, and only if both criteria are true the request is executed by RPF by calculating the information necessary to access the data on HDD based on custom static data kept by the CIS.

BRIEF DESCRIPTION OF FIGURES IN THE DRAWINGS

The invention is illustrated by way of a non limiting example in the figures of the accompanying drawings, in which like references indicate similar elements, and in which.

BEST MODE FOR CARRYING OUT THE INVENTION

Since the present invention is an improvement of WO 2007/078648 A, the same terms and reference numbers are used for similar elements. The general remarks of par. [0008] [0014] of WO 2007/078648 A apply to the present invention as well and are incorporated herein by reference.

Figure 1:
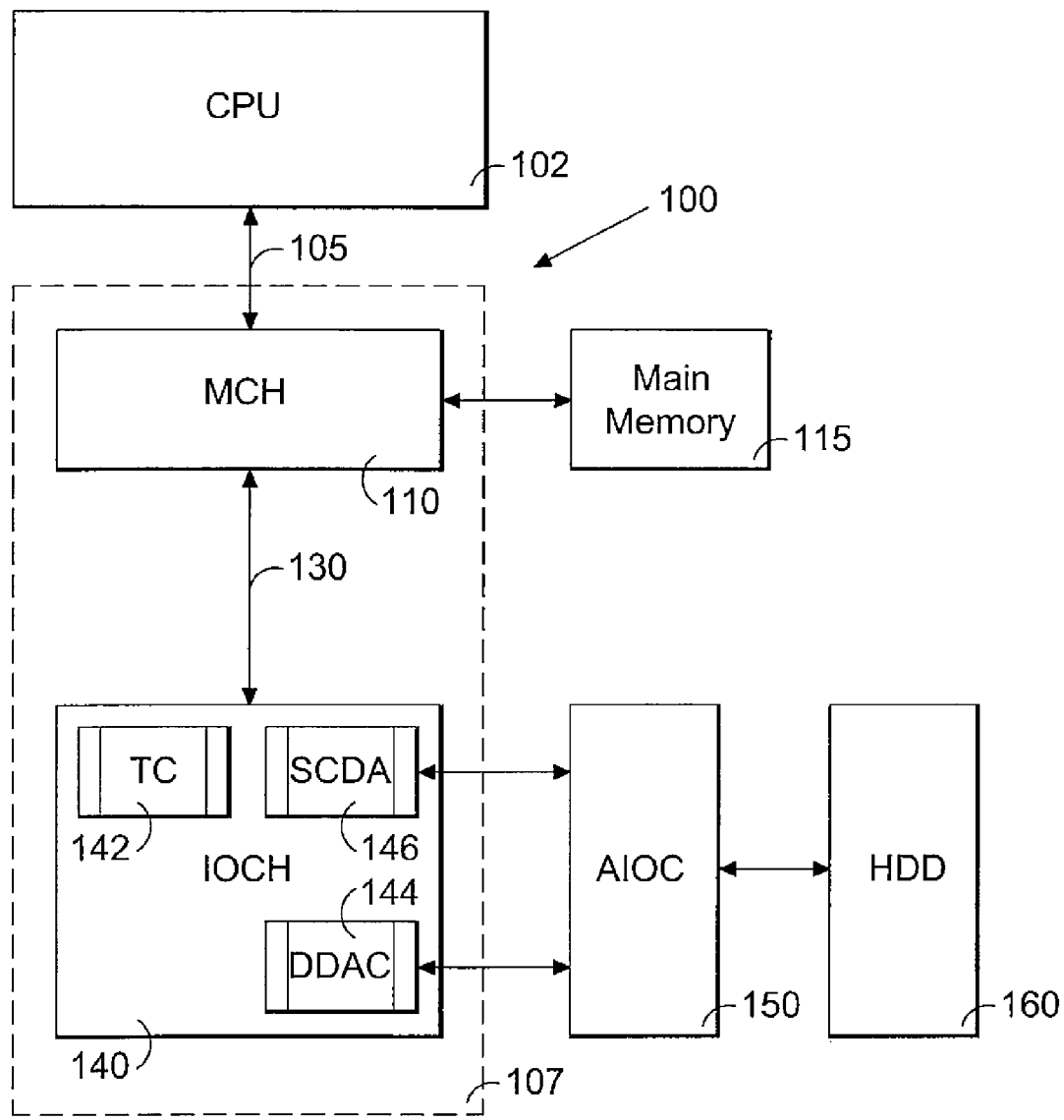
FIG. 1 is a block diagram of one embodiment of a computer system according to the present invention.

FIG. 1 is a block diagram of one embodiment of a computer system 100 according to the present invention. Computer system 100 includes a central processing unit CPU 102 coupled to bus 105. A chipset 107 is also coupled to bus 105. Chipset 107 includes a memory control hub MCH 110. MCH 110 may include a memory controller that is coupled to a main system memory 115. Main system memory 115 stores data and sequences of instructions that are executed by CPU 102 or any other device included in system 100.

In one embodiment, main system memory 115 includes dynamic random access memory DRAM; however, main system memory 115 may be implemented using other memory types. For example, in some embodiments, main system memory 115 may be implemented with a non-volatile memory.

MCH 110 is coupled to an input/output control hub IOCH 140. In one embodiment, MCH 110 and IOCH 140 are coupled via a hub interface 130. According to the present invention, IOCH 140 provides two interfaces to a data store: a direct data access control DDAC interface 144 and an interface for the semantic control of data access SCDA 146. Preferably IOCH 140 includes also a trust control module TC 142.

SCDA 146 stores custom configuration data; these are loaded into SCDA 146 by a dedicated service which controls protected code running on CPU 102. TC 142 stores and executes data and instructions; these are loaded into TC 142 by a dedicated service which controls protected code running on CPU 102. Protected code is an executable program whose execution may be initiated by an authorised user and/or by a hardware that is not controllable by unauthorized devices.

Logical Partitioning of Hard Storage Device

Figure 2:
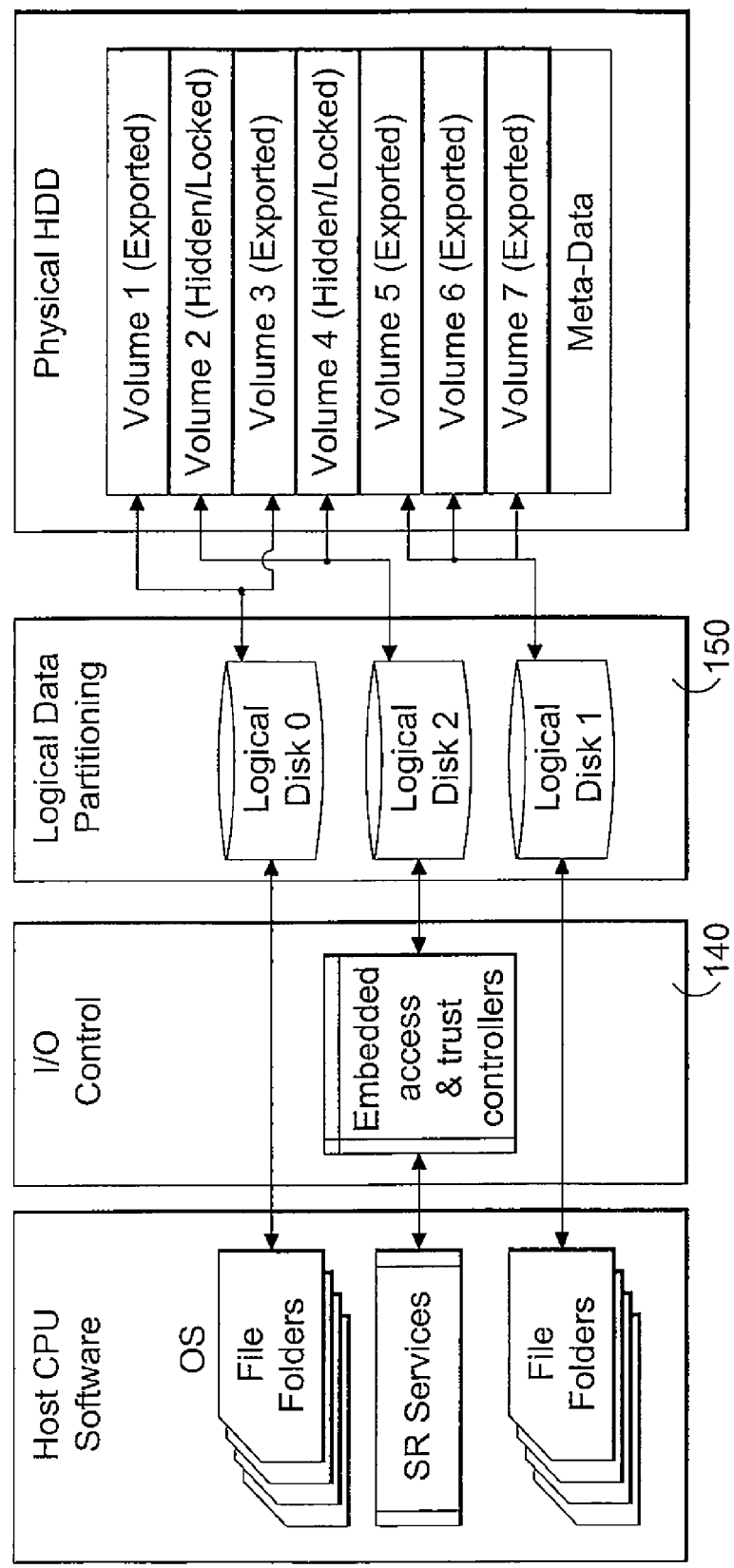
FIG. 2 illustrates one embodiment of a hard disk drive connected to a computer system.

In one embodiment of a computer system 100, an auxiliary input/output control AIOC subsystem 150 manages, maintains, and controls the access to a hard disk drive HDD 160. In the embodiment of FIG. 2 AIOC 150 divides HDD 160 into logical volumes. Further, the volume divisions are recognized based upon MetaData.

FIG. 2 illustrates one embodiment of HDD 160 partitioned into separate local volumes. MetaData describing the partitioning of HDD 160 are also stored on HDD 160. Preferably the MetaData are stored in a protected range and maintained by the subsystem AIOC 150.

Figure 3:
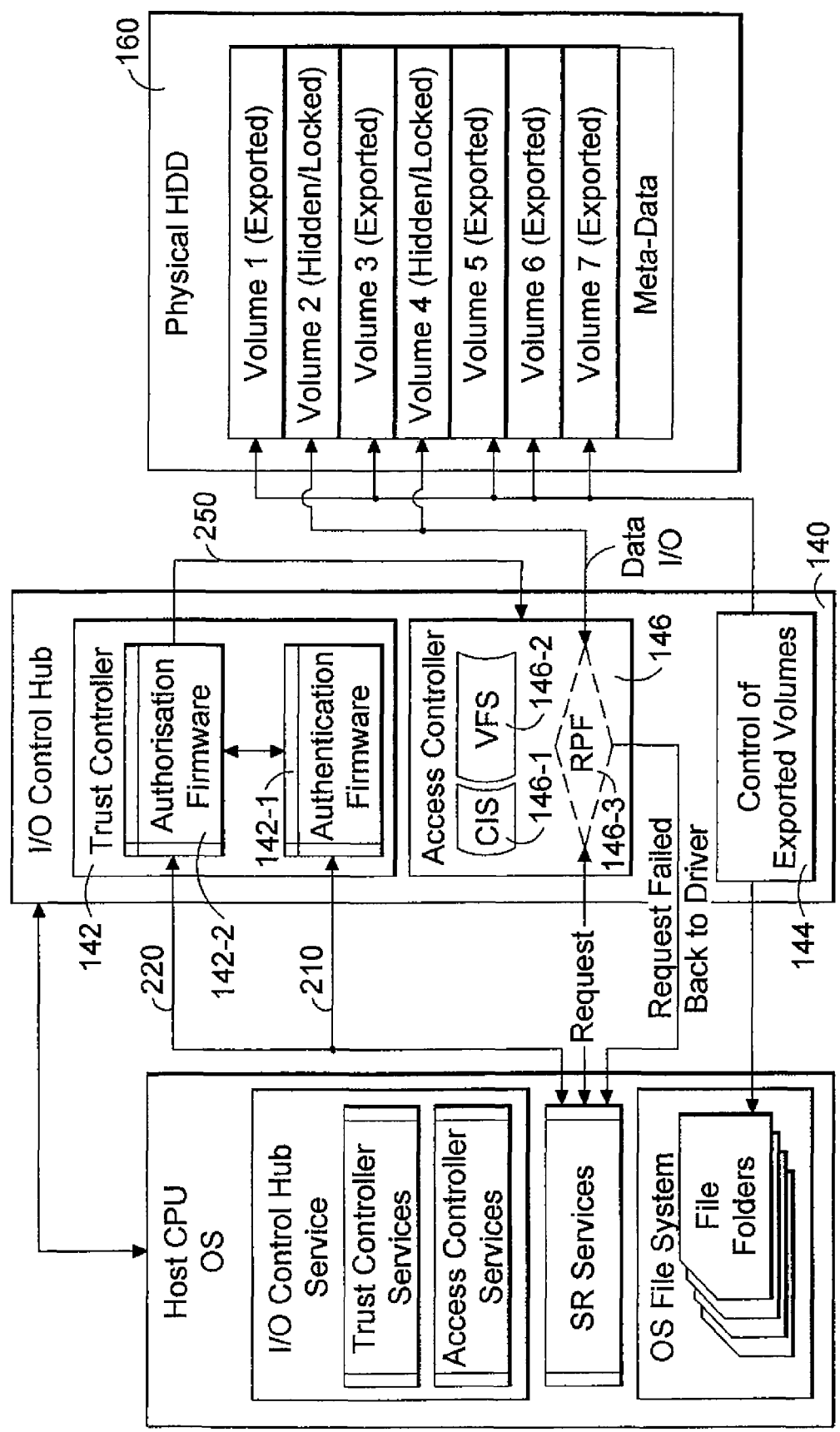
FIG. 3 illustrates another embodiment of a computer system according to the present invention.

In a further embodiment, the subsystem AIOC 150 will cause each logical volume getting additional attributes of exported/hidden and locked/unlocked to augment data protection. One set of such attributes denotes exported volumes being direct visible as logical hard disk drives to the host operating system OS of CPU 102 for read/write access via interface DDAC 144 (FIG. 1) facilitated, in one embodiment, by an OS File System (FIG. 3). The other set of attributes indicates volumes hidden and locked from the OS while being visible as logical hard disk drives to the SR services used by the OS for read/write access via interface SCDA 146 (FIG. 1).

Functionality provided by the subsystem AIOC 150 for management, maintenance, and control of access to a hard disk drive HDD 160 includes all the features defined by WO 2007/078648 A. Consequently (FIG. 2), the subsystem AIOC 150 offers separate channels to IOCH 140 in order to access the data in protected/hidden and unprotected/exported areas of HDD 160 using SCDA 146 and DDAC 144 interfaces, respectively (FIG. 1).

Semantic Data Addressing and Protection

OS of CPU 102 is a foundation for services accessible by users or by applications whose execution may be initiated by users. FIG. 3 illustrates one embodiment of a computer system 100 where native OS File System services allow users to control data on exported volumes, whereas SR services allow users to control data on volumes hidden from the native OS File System. Similarly, I/O Control Hub Services allow for control and maintenance of IOCH 140 by an authorised user and/or by a hardware that is not controllable by unauthorized devices.

In particular, the I/O Control Hub Services allow user to set-up, to maintain, and to control AIOC 150 according to WO 2007/078648 A. Further, I/O Control Hub Services allow user maintenance of firmware in TC 142, and the administration of custom configuration data in SCDA 146.

In one embodiment, TC 142 includes authentication firmware 142-1 which implements the teaching of EP 1669833β.

In one embodiment, SCDA 146 includes Request Processing Firmware RPF 146-3 augmented by stores for static custom data sets: the Current Index Store CIS 146-1, and the Volume Formatting Store VFS 146-2.

CIS 146-1 keeps data patterns obtained by RPF 146-3 by tracking all data moved into volumes visible to SR services according to rules kept in the store VFS 146-2. Further, CIS 146-2 keeps for all these gained data patterns the pointers to all such data stored on volumes visible to SR services which can be unequivocally identified by gained patterns.

VFS 146-2 keeps actual descriptions of rules used by RPF 146-3 for data tracking. Further, VFS 146-2 keeps terms which are used by RPF 146-3 to evaluate compliance between the data stored on volumes visible to SR services and an I/O Request, or an Administration Request, both being issued by an eligible user of computer system 100.

Data kept by CIS 146-1 and VFS 146-2 are custom data which alter in the course of user activities over life cycle of computer system 100. RPF 146-3 manages required changes of data kept in the stores CIS 146-1 and VFS 146-2 by performing all necessary administrative transactions with atomicity, consistency, integrity, and durability (ACID) properties.

User Control Over Protected Data

Figure 4:
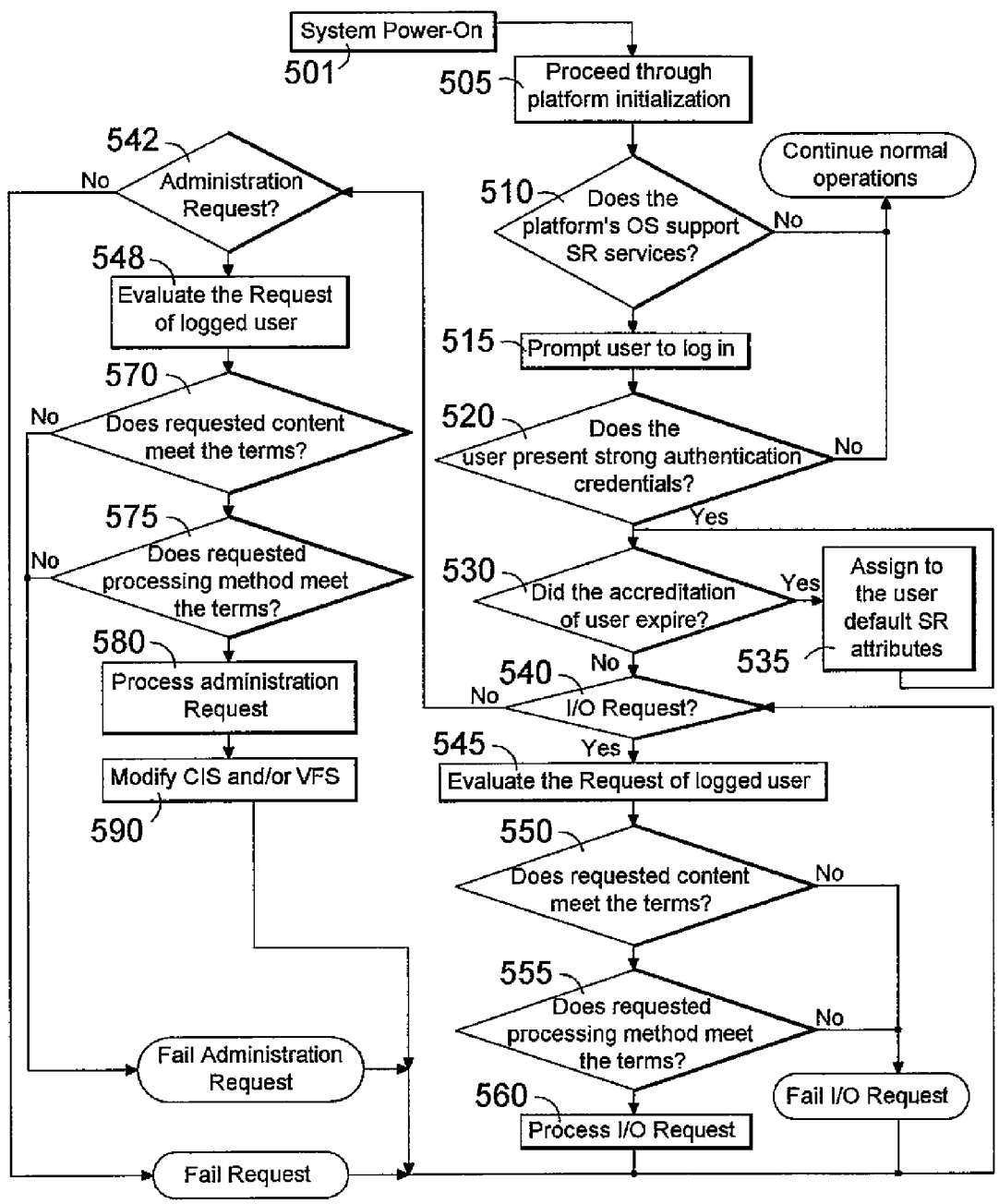
FIG. 4 is a flow diagram for one embodiment for providing Semantic Data Access protection.

FIG. 4 is a flow diagram for one embodiment of a computer system 100 according to the present invention for providing I/O Requests to a hidden/protected area on HDD 160, and for the provision of Requests which administer this access. At processing block 501, computer system 100 is powered on. At processing block 505 the initialization process of the computer system 100 occurs. At decision block 510, it is determined whether OS of computer system 100 supports the SR services. If not, computer system 100 continues to operate under normal conditions using, in one embodiment, its native file system to control volumes exported from HDD 160 by the subsystem AIOC 150.

However, if the OS of computer system 100 supports the SR services, the system user is prompted to sign in, processing block 515. At decision block 520, it is determined whether the user has completed block 515, delivering credentials required for its strong authentication by computer system 100. In order to judge about the sufficiency of the presented user credentials, SR services consult authentication firmware at TC 142-1 (FIG. 3) signaling this to TC 142 by a request over channel 210. If the credentials are not adequate for required strong authentication, the user is still authorised to operate the computer system 100 under normal conditions, and therefore, she or he can still use the OS and its native file system on computer system 100 to access volumes exported from HDD 160 by the subsystem AIOC 150 via DDAC 144.

Further on, at decision block 530, SR services consult authorization firmware TC 142-2 (FIG. 3), signaling this to TC 142 by a request over channel 220, to determine whether the user already authenticated at decision block 520 is in spite of everything an eligible user of SR services at computer system 100. If yes, a user specific secret will be disclosed to SCDA 146 over the channel 250 as well as in the form of a response to the request previously sent over the bus 220, and via SR services, to the user authenticated at decision block 520. If not, e.g. because the accreditation expired, TC 142 assigns to that user at processing block 535 attributes default for SR facilitated by SR services supported on computer system 100 and then the control will be returned to processing block 530 for the disclosure of a secret. I.e. such a user will not be excluded from SR, but will gain some limited access, e.g. for checking when her or his accreditation expired.

The request issued by eligible user authenticated at decision block 520 is handed over from OS to SR services at decision block 540 and then to the interface SCDA 146 (FIG. 1) for evaluation whether that request is an I/O Request. Within interface SCDA 146, the evaluation and the decision is made by the decision block 146-3 (FIG. 3); then, if the request is an I/O Request, the decision block 146-3 evaluates this request more advanced (FIG. 4 processing block 545) in order to extract the parameters required to access the data on volumes being visible as logical hard disk drives to the SR services (FIG. 2) used by OS for read/write access to the data via interface SCDA 146.

On FIG. 4, decision blocks 550 and 555 represent further processing of an I/O Request by the interface SCDA 146. At decision block 550, it is determined whether the types of content-specific data conveyed by the request meet the compulsory terms. If not, the I/O Request fails. At decision block 555, it is determined whether the methods required to process content-specific data conveyed by the request meet the compulsory terms. If not, the I/O Request fails. Within interface SCDA 146 (FIG. 3), the evaluations and the decisions are made, in both cases, by the decision block 146-3 based on static custom data kept by the VFS 146-2. For successful I/O Requests, the decision block 146-3 calculates further the information necessary to access the data on HDD 160 based on custom static data kept by the CIS 146-1.

On FIG. 4, at processing block 560, the interface SCDA 146 issues Data I/O Request to HDD 160. Then, it looks after and receives the response from HDD 160. Further, the interface SCDA 146 processes the response from HDD 160 in order to complete I/O Request received from SR services at processing block 540.

Referring back to the decision block 540, if the request is not identified as an I/O Request, it is evaluated further at the decision block 542 whether it is an Administration Request. If not, the request fails.

At processing block 548 and at decision blocks 570 and 575, an Administration Request is processed in the same way as processing block 545 and decision blocks 550 and 555 do this for an I/O Request.

At processing block 580, the RPF 146-3 (FIG. 3) calculates administrative changes requested to the content of CIS 146-1 and/or to the content of VFS 146-2. At processing block 590 RPF 146-3 implements calculated changes to the content of CIS 146-1 store, and/or to the content of VFS 146-2 store by accomplishing of necessary transactions. As a result, RPF 146-3, after having successfully accomplished transaction, unlocks (or locks) the processing of particular I/O Requests at decision blocks 550 and 555, respectively (and/or of administration requests at decision blocks 570 and 575, respectively). If at processing block 590 a transaction carrying administrative changes fails, the whole Administration Request fails.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

The invention claimed is:

1. A computer system comprising:
   a central processing unit;
   an input/output control hub connected to the central processing unit by a bus or a hub interface; and
   a storage device;
   wherein:
   the input/output control hub comprises a direct data access control connected to the storage device;
   the direct data access control including lock registers having values that correspond to the ranges of locked sectors of the storage device, the lock registers checking whether a storage device access request is targeted for ranges of sectors of the storage device that are locked,
   a chipset is provided having an embedded controller for authenticating the storage device access request and for managing configuration of the storage device,
   the input/output control hub further comprises an interface for semantic control of data access that stores custom configuration data that can be loaded into the interface for the semantic control of data access only by a dedicated service that controls protected code running on the central processing unit, and
   an auxiliary input/output control AIOC subsystem is provided between the input/output control hub and the storage device that manages, maintains, and controls access to the storage device, the auxiliary input/output control AIOC being connected to the input/output control hub by separate channels to provide access to data in unprotected areas of the storage device using the direct data access control and to data in protected areas of the storage device using the semantic control of data access.

2. The computer system according to claim 1, wherein the auxiliary input/output control AIOC divides the storage device into logical volumes that are recognized based up on Metapata.

3. The computer system according to claim 1, wherein the input/output control hub includes a trust control module storing and executing data and instructions that can be loaded into the trust control module only by a dedicated service that controls protected code running on the central processing unit.

4. The computer system according to claim 3, wherein the trust control module includes authentication firmware and authorization firmware.

5. A computer system comprising:
   a central processing unit;
   an input/output control hub connected to the central processing unit by a bus or a hub interface; and
   a storage device;
   wherein:
   the input/output control hub comprises a direct data access control connected to the storage device;
   the direct data access control includes lock registers having values that correspond to the ranges of locked sectors of the storage device, the lock registers checking whether a storage device access request is targeted for ranges of sectors of the storage device that are locked, a chipset is provided having an embedded controller for authenticating the storage device access request and for managing configuration of the storage device, the input/output control hub further comprises an interface for semantic control of data access that stores custom configuration data that can be loaded into the interface for the semantic control of data access only by a dedicated service that controls protected code running on the central processing unit, and the semantic control of data access includes Request Processing Firmware augmented by stores for a Current Index Store or a Volume Formatting Store, the Volume Formatting Store keeping actual descriptions of rules used by the Request Processing Firmware for data tracking and keeping terms used by the Request Processing Firmware to evaluate compliance between the data stored on volumes visible to SR services and an I/O Request, or an Administration Request, both being issued by an eligible user of computer system.

6. The computer system according to claim 5, wherein the Current Index Store keeps data patterns obtained by the Request Processing Firmware by tracking all data moved into volumes visible to SR services according to rules kept in the Volume Formatting Store.

7. The computer system according to claim 6, wherein the Current Index Store keeps for all the kept data patterns pointers to all such data stored on volumes visible to SR services that can be unequivocally identified by kept patterns.

8. The computer system according to claim 5, wherein Data kept by the Current Index Store and the Volume Formatting Store are custom data that alter in the course of user activities over the life cycle of the computer system.

9. The computer system according to claim 5, wherein the Request Processing Firmware manages required changes of data kept in the current index and volume formatting stores and by performing all necessary administrative transactions with atomicity, consistency, integrity, and durability properties.

10. The computer system according to claim 5, wherein for an I/O request the Request Processing Firmware determines, based on static custom data kept by the Volume Formatting Store, whether the types of content-specific data conveyed by the request meet the compulsory terms and whether the methods required to process content-specific data conveyed by the request meet the compulsory terms, and only if both criteria are met is the request executed by the Request Processing Firmware by calculating the information necessary to access the data on the storage device based on custom static data kept by the Current Index Store.

11. The computer system according to claim 5, wherein an auxiliary input/output control AIOC subsystem is provided between the input/output control hub and the storage device that manages, maintains, and controls access to the storage device, the auxiliary input/output control AIOC being connected to the input/output control hub by separate channels to provide access to data in unprotected areas of the storage device using the direct data access control and to data in protected areas of the storage device using the semantic control of data access.

* * * * *